US00RE39407E

(19) United States
(12) Reissued Patent
Cortinovis

(10) Patent Number: US RE39,407 E
(45) Date of Reissued Patent: Nov. 28, 2006

(54) SOCKS

(75) Inventor: Giulio Cortinovis, Tucson, AZ (US)

(73) Assignee: Eurosocks North America, Inc., Warwick, RI (US)

(21) Appl. No.: 29/165,757

(22) Filed: Aug. 16, 2002

Related U.S. Patent Documents

Reissue of:
(64) Patent No.: Des. 429,557
Issued: Aug. 22, 2000
Appl. No.: 29/103,094
Filed: Apr. 8, 1999

(51) LOC (8) Cl. ..... 02-04
(52) U.S. Cl. ..... D2/980
(58) Field of Classification Search ..... D2/980, D2/983, 985, 986, 987, 989, 992, 994; 2/239, 2/240; 66/135, 185
See application file for complete search history.

(56) References Cited

U.S. PATENT DOCUMENTS

| | | | | | |
|---|---|---|---|---|---|
| 323,287 | A | * | 7/1885 | Appleton | 66/178 R |
| 1,062,910 | A | * | 5/1913 | Hirner | 66/180 |
| 2,144,563 | A | * | 1/1939 | Davis | 66/182 |
| 2,157,116 | A | * | 5/1939 | Carothers | 66/178 R |
| D209,129 | S | * | 11/1967 | Killian | D2/980 |
| D300,086 | S | * | 3/1989 | Gaither | D2/980 |
| D392,795 | S | * | 3/1998 | Ogden | D2/980 |
| D403,149 | S | * | 12/1998 | Fincher | D2/989 |
| D414,601 | S | * | 10/1999 | Cortinovis | D2/989 |
| D437,480 | S | * | 2/2001 | Cortinovis | D2/989 |
| 6,536,051 | B1 | * | 3/2003 | Oh | 2/239 |

* cited by examiner

*Primary Examiner*—Paula A. Greene
(74) *Attorney, Agent, or Firm*—Joseph P. Quinn; Brown Rudnick Berlack Israels LLP

(57) CLAIM

The ornamental design for socks, as shown and described.

DESCRIPTION

FIG. 1 is a bottom plan view of a sock showing my new design, solid black being used in the drawings to indicate color contrast;
FIG. 2 is a side elevational view thereof, the opposite side is a mirror image, the sock is of conventional thickness;
FIG. 3 is a side elevational view of a second embodiment of a sock showing my new design, the sock is of conventional thickness;
FIG. 4 is a bottom plan view thereof;
FIG. 5 is a bottom plan view of a third embodiment of a sock showing my new design, the side being similar to FIG. 3;
FIG. 6 is a bottom plan view of a fourth embodiment of a sock showing my new design; and,
FIG. 7 is a side elevational view, the opposite side is a mirror image.
*The broken lines illustrating the letters NRG throughout the drawings indicate the boundary of the claimed design and form no part thereof.*

1 Claim, 3 Drawing Sheets

Figure 1:
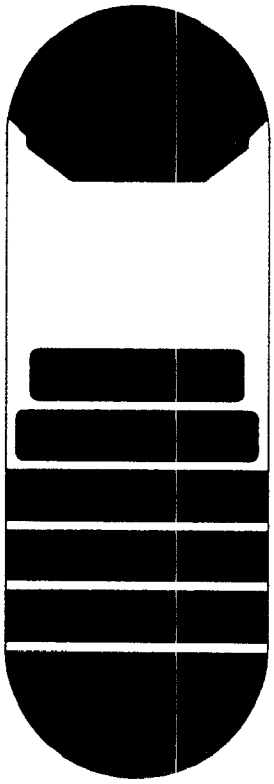
Figure 2:
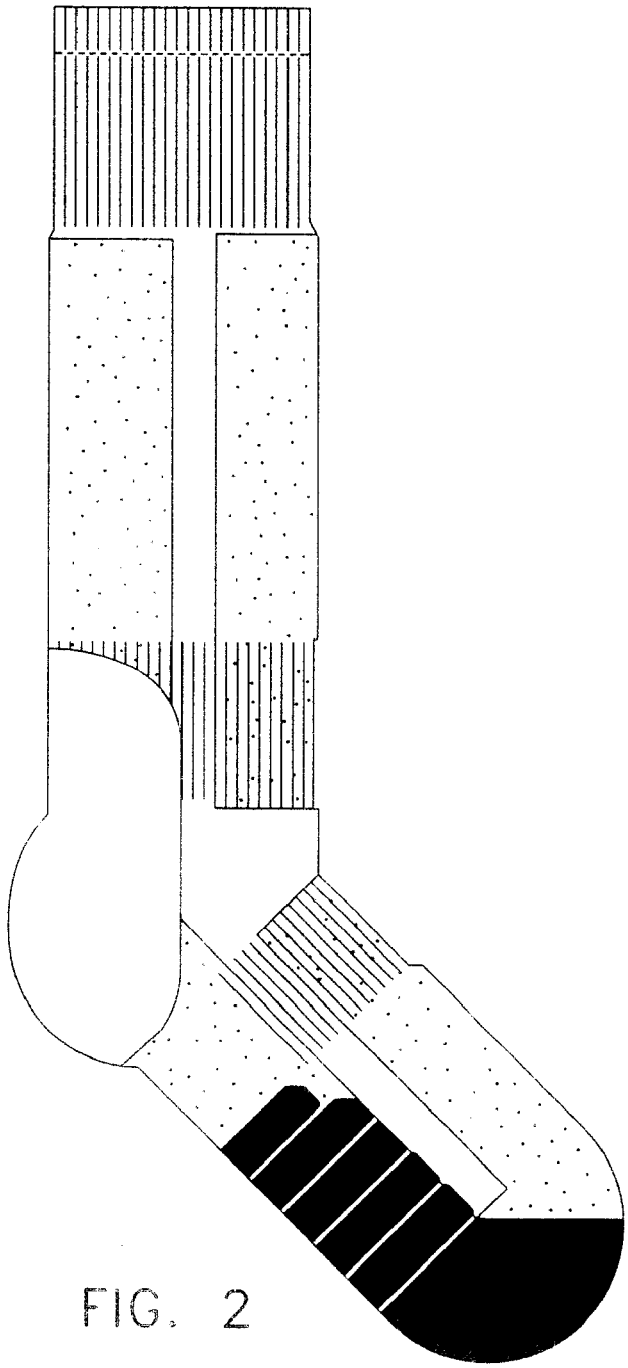
Figure 3:
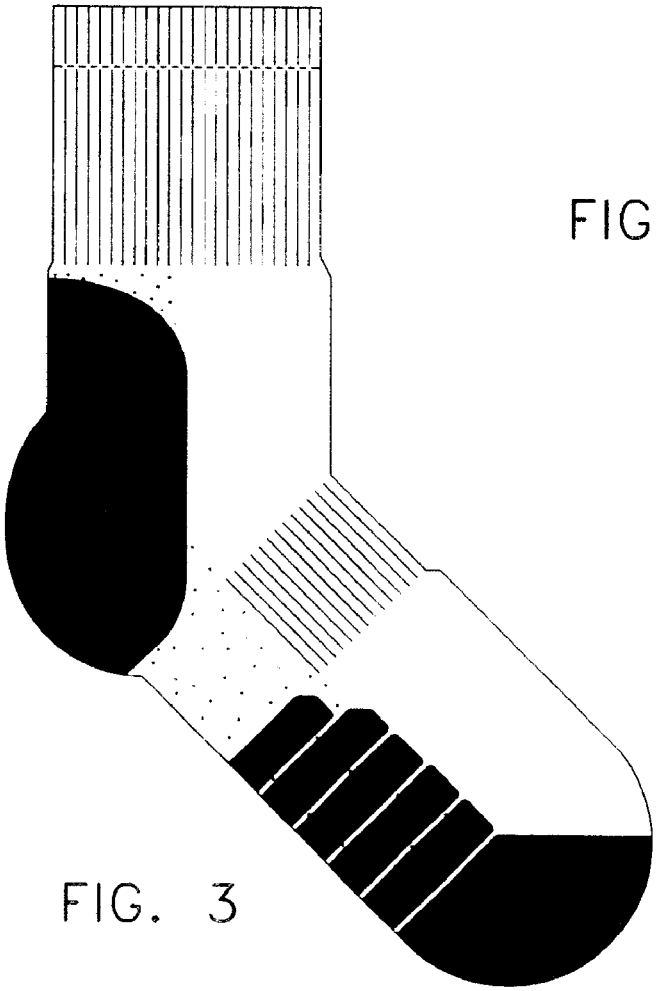
Figure 4:
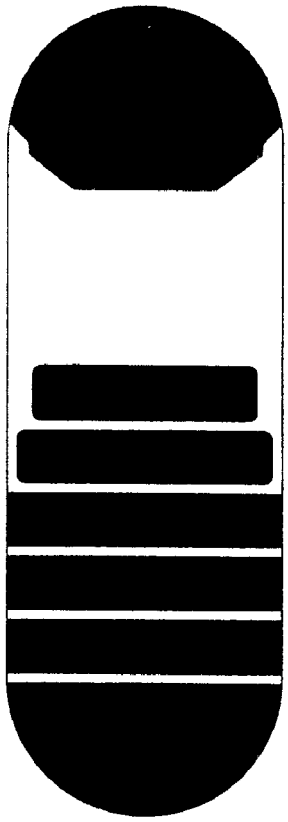
Figure 5:
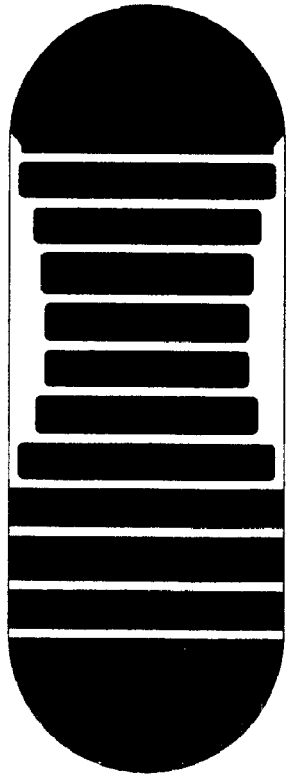
Figure 6:
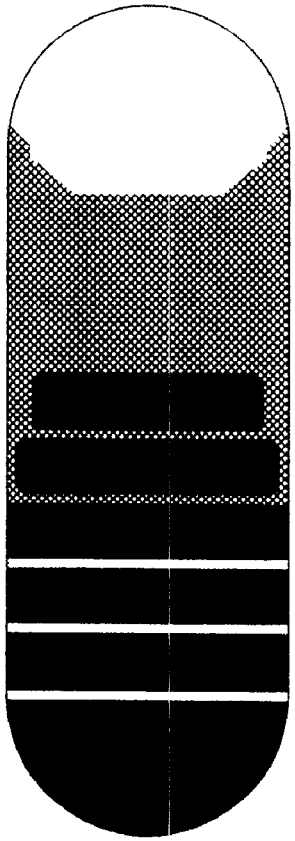
Figure 7:
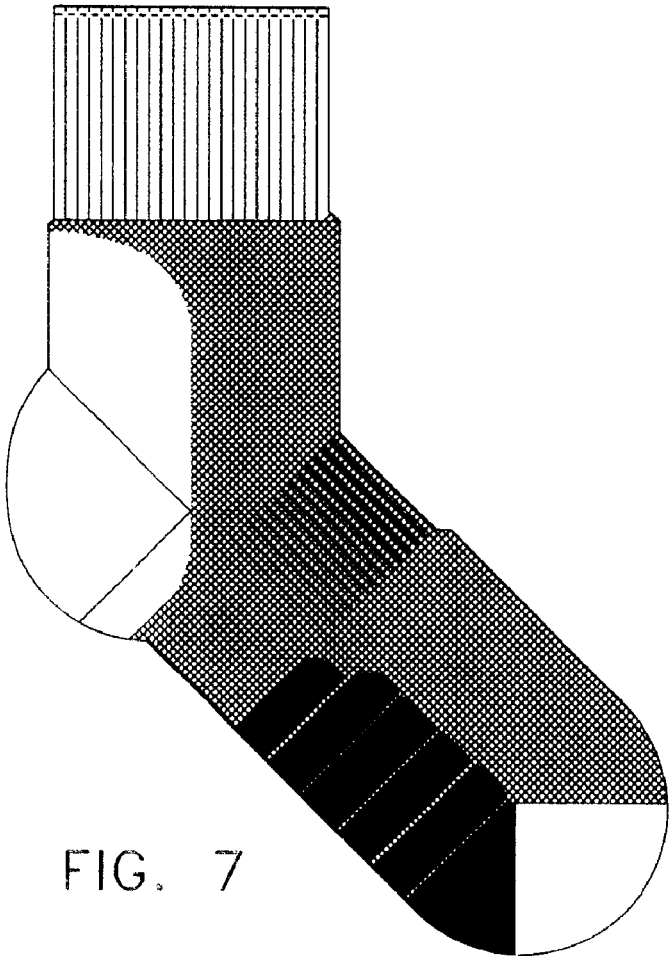

Matter enclosed in heavy brackets [ ] appears in the original patent but forms no part of this reissue specification; matter printed in italics indicates the additions made by reissue.

* * * * *